United States Patent [19]

Brautigan

[11] 4,395,017
[45] Jul. 26, 1983

[54] BUTTERFLY VALVE SEALING MEANS HAVING AN IMPROVED O-RING GROOVE

[75] Inventor: Richard A. Brautigan, Tulsa, Okla.

[73] Assignee: Dover Corporation, Tulsa, Okla.

[21] Appl. No.: 332,959

[22] Filed: Dec. 21, 1981

Related U.S. Application Data

[63] Continuation of Ser. No. 124,538, Feb. 25, 1980, abandoned.

[51] Int. Cl.$^3$ .................. F16J 15/32; F16K 1/226
[52] U.S. Cl. ........................ 251/306; 251/DIG. 1; 277/12; 277/170; 277/152
[58] Field of Search ............ 277/152, 170–172, 277/12, 32; 251/306, DIG. 1; 285/DIG. 19

[56]  References Cited

U.S. PATENT DOCUMENTS

| | | | |
|---|---|---|---|
| 874,652 | 12/1907 | Bailey | 277/DIG. 1 |
| 2,585,556 | 2/1952 | Johnson | 277/170 X |
| 2,705,177 | 3/1955 | Waring | 285/DIG. 19 |
| 2,987,072 | 6/1961 | Muller | 251/306 |
| 3,234,966 | 2/1966 | Klose | 251/306 X |
| 3,667,504 | 6/1972 | Wittren et al. | 251/DIG. 1 X |
| 3,910,555 | 10/1975 | Bertrem et al. | 251/306 |
| 3,970,109 | 7/1976 | Uerlichs et al. | 251/DIG. 1 X |

Primary Examiner—Robert S. Ward, Jr.
Attorney, Agent, or Firm—Head, Johnson & Stevenson

[57]  ABSTRACT

An improved O-ring groove for a sealing member, the groove being formed in the sealing surface of the member, the groove in cross-section having an outer portion communicating with the sealing surfaces and an inner portion, the inner portion being of width greater than the outer portion, the juncture of the inner and outer portions providing opposed ledge surfaces, the cross-sectional area of the groove inner portion being greater than that of the outer portion and a gasket preferably in the form of an O-ring received in the groove substantially filling the groove inner and outer portions and normally extending slightly beyond the sealing surface.

1 Claim, 5 Drawing Figures

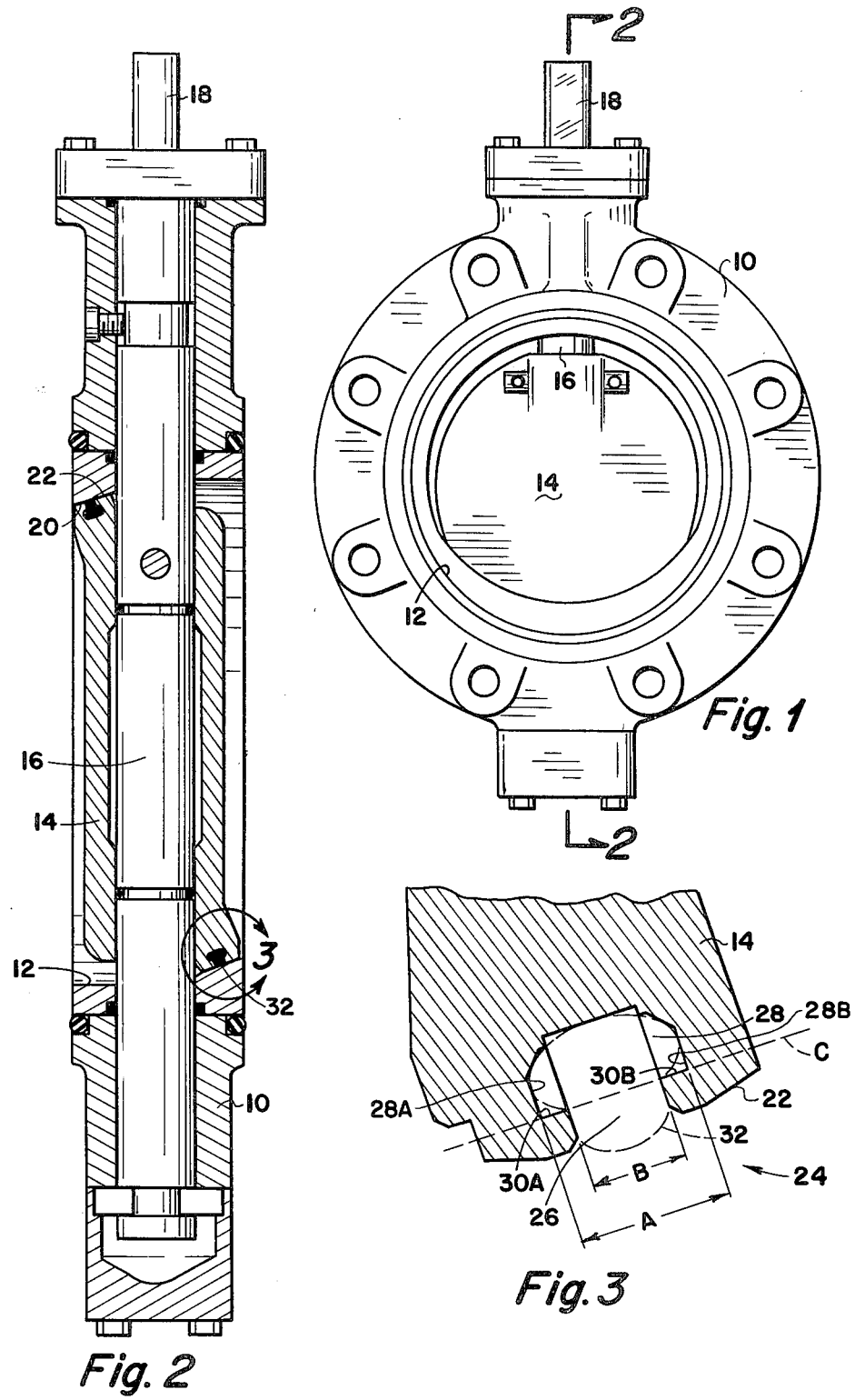

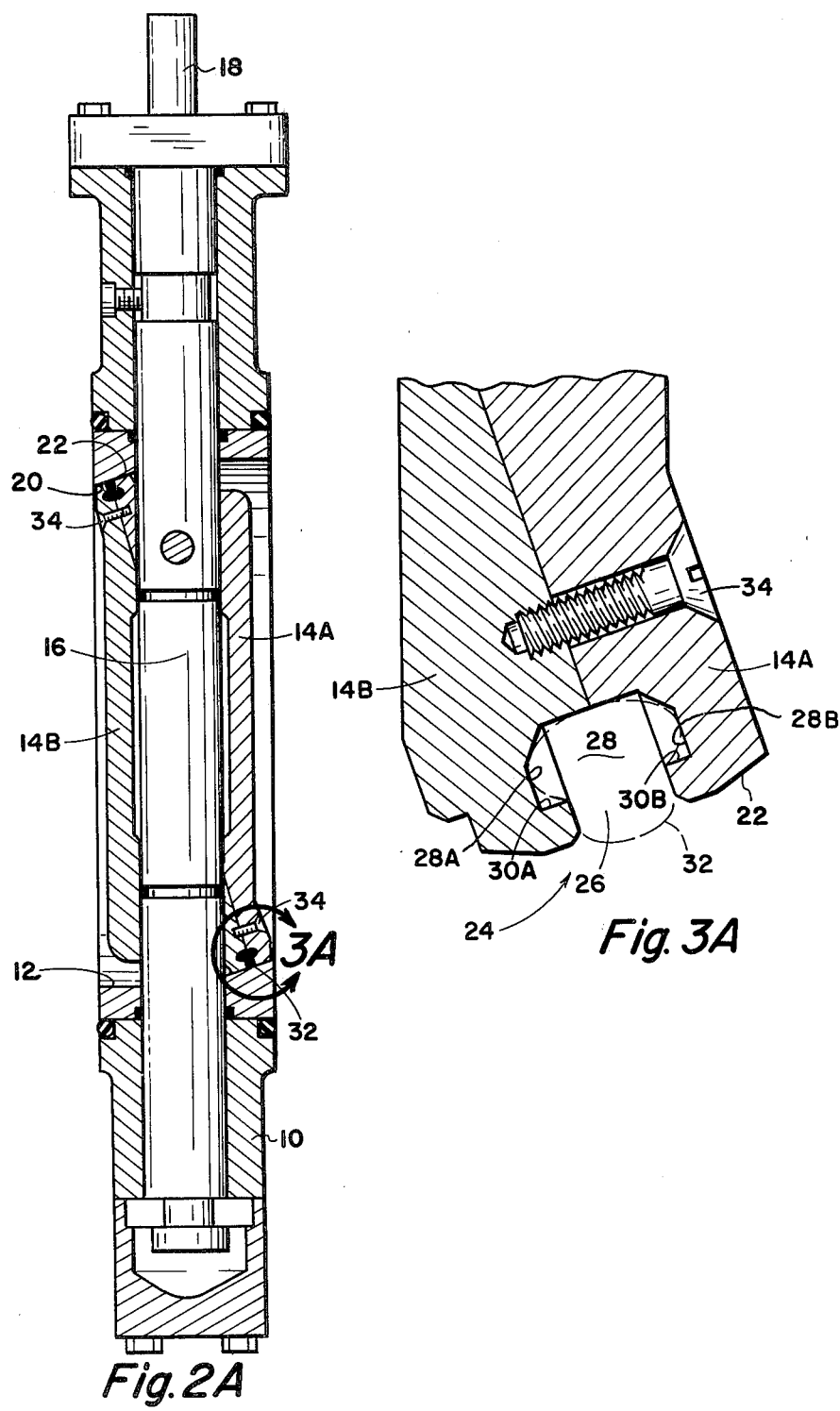

BUTTERFLY VALVE SEALING MEANS HAVING AN IMPROVED O-RING GROOVE

This is a continuation application of Ser. No. 124,538, filed Feb. 25, 1980, now abandoned.

BACKGROUND OF THE INVENTION

1. Field of the Invention

This invention is related to an improved gasket groove for use in a sealing member. More particularly, the invention relates to a sealing member having a groove to receive a gasket, preferably in the form of an O-ring.

2. Description of the Prior Art

A common expedient for sealing a surface of one member to another member is to provide a gasket so that a resilient seal is obtained. In many instances the gasket is placed in a groove so as to retain the gasket in position and a further common expedient is to use an O-ring as the gasket member. An O-ring is a continuous member which, in cross-section, in the non-deformed state, is circular. O-rings are a preferred gasket configuration because of their simplicity, economy, uniformity, dependability and availability.

The usual configuration of a groove for receiving an O-ring gasket is a parallel sided slot, usually of substantially rectangular cross-sectional configuration with the dimension of the groove being such that in the normal, non-sealing state, the O-ring gasket extends slightly beyond the sealing surfaces. When the member is moved to a closed position the O-ring is compressed, thereby providing a resilient seal. The parallel sided O-ring groove is successful in applications where the gasket is not inclined to be dislodged. For more demanding application, others have provided a groove having a lip adjacent the sealing surface to help retain the O-ring in position.

One particular use of an O-ring gasket is in butterfly type valves. In this type valve a disc has a circumferential sealing surface which, when the valve is in closed position, contacts a similar circumferential sealing surface inside the valve body. One problem with the use of O-rings in high pressure environments is that fluid pressure builds within the groove beneath the O-ring. Sudden changes of fluid pressure can cause the O-ring to be expelled from the groove. In order to attempt to solve this problem, small diameter pressure relief openings have been drilled from the sidewall of the valve disc into the lower portion of the O-ring groove in order to relieve pressure. While this helps alleviate the possibility of expulsion of the O-ring from the groove, it is not a complete solution to the problem since sudden pressure changes may not be relieved quickly enough to prevent the O-ring being displaced.

An object of the present invention is to provide an improved configuration for a groove to receive a gasket, particularly an O-ring type gasket, wherein the gasket is retained within the groove to a higher degree of certainty than with existing O-ring groove configurations.

This general object as well as other and more specific objects of the invention will be fulfilled in the following description and claims, taken in conjunction with the attached drawings.

SUMMARY OF THE INVENTION

A closure member sealing surface is provided with an improved groove for receiving a gasket, particularly in the form of an O-ring. The groove in cross-section is defined by an outer portion which communicates with the closure member sealing surface. The groove is further defined by an inner portion, that is, the portion displaced furthest away from the sealing surface and surrounded on all sides, by the closure member except for the communication of the inner portion with the outer portion. The width of the groove inner portion is greater than that of the outer portion so that at the juncture of the outer and inner portions a ledge to either side of the groove outer portion is provided. The cross-sectional area of the groove inner portion is greater than that of the outer portion. The O-ring gasket is forced into the groove so that the major portion thereof is within the groove inner portion and the O-ring gasket, in cross-section, is deformed so that it extends through the groove outer portion and, when the member is in the non-closed position, a part of the O-ring extends beyond the member sealing surface.

DESCRIPTION OF THE VIEWS

FIG. 1 is an end view of a butterfly valve illustrative of the type apparatus to which the improved gasket groove of the present invention is particularly applicable. The valve of FIG. 1 is shown with the disc member in closed position.

FIG. 2 is an enlarged cross-sectional view of the butterfly valve of FIG. 1 taken along the line 2—2 of FIG. 1 and showing the disc in closed position and further, showing the improved gasket groove of the invention employed in the peripheral seating surface of the valve disc.

FIG. 3 is an enlarged fragmentary view of the cross-sectional configuration of the valve disc of FIG. 2, the enlarged view showing the cross-sectional configuration of the improved gasket groove of the invention.

FIG. 3A illustrates an alternate arrangement of the valve disc in which the disc is bifurcated and in which the improved gasket groove is formed partially in each portion.

DETAILED DESCRIPTION OF THE PREFERRED EMBODIMENT

Referring to FIGS. 1 and 2, a butterfly valve is shown which is illustrative of one environment in which the present invention is particularly useful. It should be understood initially that the present invention is not directed to the butterfly valve of FIGS. 1 and 2 but is directed only to the improved sealing arrangement, and more precisely, to the improved configuration of the gasket groove which will be described in detail. The valve of FIGS. 1 and 2 is helpful to illustrate an environment in which the present invention is particularly useful. The valve includes a body 10 shown in end view in FIG. 1, the body having a fluid passageway 12 therethrough. Rotatably positioned within the fluid passageway is a valve disc 14 which is supported by a stem 16. A portion of the stem 18 extends externally of the valve to provide means for rotation of the disc whereby it may be moved between the open and closed positions.

Referring to FIG. 2, the valve body fluid passageway 12 is defined in part by a circumferential sealing surface 20. The plane of the sealing surface 20 is offset relative to the axis of stem 16 so that the sealing surface extends uninterruptedly around the fluid passageway 12. In like manner, the valve disc 14 has a disc seating surface 22, the plane of which is offset relative to the axis of shaft 16 so that seating surface 22 extends uninterruptedly circumferentially around the disc. When the disc is in closed position as shown in FIGS. 1 and 2, the disc seating surface 22 mates with the valve sealing surface 20 so that the valve is closed. When the stem 16 is rotated 90°, the disc is placed in like manner 90° relative to the plane of the valve seating surface and the fluid can flow through the valve to either side of the disc and valve stem.

The valve described to this point is a type of butterfly valve which is in commercial production. In order to improve the sealing characteristics of the valve, it has been a practice to provide a resilient seat in one or the other of the seating surfaces 20 or 22; however, the preferred and most commonly practiced arrangement is to provide a resilient seal in the disc seating surface 22. For this purpose a groove is provided in the disc seating surface 22 and a resilient O-ring gasket is placed in the groove. As previously referred to, a problem which exists is that when the valve is used for high pressure applications, fluid pressure can build beneath the O-ring gasket. When the valve is suddenly opened a drastic change can take place in the pressure surrounding the gasket, and if the pressure of the fluid beneath the valve gasket is greater than that externally of the valve seat there is a tendency for the gasket to be displaced. If the valve gasket is displaced slightly from the seat, when the valve disc is moved back again to the closed position with the gasket out of or even partially out of the groove in the disc seating surface, the gasket can be distorted or cut completely and therby the effectiveness of the valve is destroyed, or at least substantially deteriorated so that the valve is likely to leak.

The present invention is directed towards an improved configuration of the groove in the valve disc seating surface 22 and is illustrated in enlarged view of FIG. 3. The groove, indicated generally by the numeral 24, is formed of an outer portion 26 and an inner portion 28. The outer portion 26 communicates with the disc seating surface 22 while the inner portion 28 is completely surrounded by the material of the disc except for its communication with the groove outer portion 26. In the cross-sectional view of the groove of FIG. 3, the groove inner portion has a width A and the outer portion a width B. The width A is greater than width B. At the juncture of the inner portion 28 and outer portion 26 ledges 30A and 30B are formed. The ledges 30A and 30B are preferably in a common plane as illustrated.

The width A should be at least 140% of width B. The cross-sectional area of the groove inner portion 28 is greater than the cross-sectional area of the groove outer portion 26, and preferably, the area of the inner portion 28 is at least 140% of the area of the outer portion 26.

The total area of the groove inner and outer portions 28 and 26 is preferably about 105% of the cross-sectional area of the O-ring gasket which the groove is dimensioned to accommodate. In FIG. 3 the O-ring gasket is shown in dotted outline as positioned within the groove 24. In its normal non-compressed state the O-ring gasket 32 extends beyond the seating surface 22 and provides resilient engagement with the valve body seating surface 20 when the valve disc is in closed position. When the valve disc is moved into the closed position, the O-ring gasket 32 is compressed and the resiliency of the gasket maintains a compressive force against the valve body seating surface 20, ensuring a leak-proof closure of the valve.

The ledges 30A and 30B are in a common plane indicated by the letter C which separates the groove outer portion 26 from the inner portion 28.

FIGS. 2A and 3A show an alternate arrangement in which the valve disc is bifurcated along a plane of the circumferential groove 24, the two portions of the disc being identified as 14A and 14B. The two portions of the disc are held together such as by means of bolts 34. Groove 24 can be formed in each disc portion 14A and 14B employing simpler machining techniques than are required for forming the groove in the unitary disc of the embodiment of FIGS. 2 and 3. The O-ring 32 may be pressed into the assembled disc in the same manner as in the unitary disc of FIG. 3.

The O-ring gasket 32 is preferably of a smaller normal circumferential diameter than that of groove 32. That is, the O-ring should be stretched slightly beyond its normal circumferential length as it fits in the groove 24. This stretch aids in retaining the O-ring in the groove and helps further ensure retention during sudden pressure changes. The circumference of groove 24 should be about 106% of the normal circumference of the O-ring; that is, the O-ring is preferably stretched about 6% as it is installed in groove 24.

While the invention has been described with a certain degree of particularity, it is manifest that many changes may be made in the details of construction and the arrangement of components without departing from the spirit and scope of this disclosure.

It is understood that the invention is not limited to the embodiments set forth herein for purposes of exemplification but is to be limited only by the scope of the attached claim or claims, including the full range of equivalency to which each element thereof is entitled.

What is claimed:

1. In a butterfly valve having a body with an internal circumferential sealing surface and a disc rotatably supported in the valve body, the disc having a circumferential sealing surface therearound, the disc being rotatable so that when the valve is in the closed condition the disc sealing surface is adjacent to or in physical contact with the body sealing surface, the improvement comprising a groove formed in the valve disc sealing surface, the groove in cross section having an outer portion communicating with the disc sealing surface and an inner portion, the groove outer portion having paralleled sidewalls in said cross section, the inner portion being also defined in part by paralleled sidewalls in said cross section, the width of the inner portion between its sidewalls being at least 140% of the width of the outer portion between its sidewalls, the cross-sectional area of the inner portion in said cross section being at least 140% of the cross-sectional area of the groove outer portion in said cross section, the juncture of the inner and outer portions in said cross section providing opposed ledge surfaces in a common plane; and an O-ring gasket received in said groove, the cross-sectional area of the total of the groove inner and outer portions being about 105% of the cross-sectional area of the O-ring gasket, the O-ring gasket when in position in the groove normally extending slightly beyond the disc sealing surface to compressibly engage the valve body sealing surface when the valve is in the closed condition.

* * * * *